(12) United States Patent
Morita et al.

(10) Patent No.: US 10,531,033 B2
(45) Date of Patent: Jan. 7, 2020

(54) SOLID STATE IMAGING DEVICE

(71) Applicant: CANON KABUSHIKI KAISHA, Tokyo (JP)

(72) Inventors: Hiroyuki Morita, Ebina (JP); Kei Ochiai, Inagi (JP); Tetsuya Itano, Sagamihara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/832,038

(22) Filed: Dec. 5, 2017

(65) Prior Publication Data
US 2018/0184031 A1    Jun. 28, 2018

(30) Foreign Application Priority Data
Dec. 28, 2016 (JP) .................... 2016-255024

(51) Int. Cl.
| | |
|---|---|
| H04N 5/378 | (2011.01) |
| H04N 5/374 | (2011.01) |
| H04N 1/00 | (2006.01) |
| H04N 5/357 | (2011.01) |
| H04N 5/376 | (2011.01) |

(52) U.S. Cl.
CPC ......... *H04N 5/378* (2013.01); *H04N 1/00978* (2013.01); *H04N 5/357* (2013.01); *H04N 5/3765* (2013.01)

(58) Field of Classification Search
CPC ........ H04N 5/378; H04N 5/357; H04N 5/374; H04N 5/3765; H04N 5/23212; H04N 1/00978
See application file for complete search history.

(56) References Cited

U.S. PATENT DOCUMENTS

| | | | |
|---|---|---|---|
| 7,126,102 B2 | 10/2006 | Inoue et al. | ............ 250/214 R |
| 7,321,110 B2 | 1/2008 | Okita et al. | ............ 250/208.1 |

(Continued)

FOREIGN PATENT DOCUMENTS

| | | |
|---|---|---|
| JP | 2012-151664 | 8/2012 |
| JP | 2012-151664 A | 8/2012 |
| JP | 2016-9879 | 1/2016 |

OTHER PUBLICATIONS

U.S. Appl. No. 15/711,105, filed Sep. 21, 2017.

(Continued)

*Primary Examiner* — Nelson D. Hernández Hernández
(74) *Attorney, Agent, or Firm* — Venable LLP (57) ABSTRACT

Provided is an imaging device including a pixel array including pixels; a readout circuit that reads out signals from the pixels; a temperature sensor that outputs a signal in accordance with a temperature; and a current control circuit that controls a current supplied to the temperature sensor. The current control circuit performs control in a first period such that a predetermined current is supplied to the temperature sensor, and performs control in a second period such that a current supplied to the temperature sensor becomes smaller than the predetermined current or stops. The first period is set in a first blanking period between a process in which the first readout circuit reads out one frame of signals output from the pixels and a process in which the first readout circuit reads out next one frame of signals output from the pixels.

21 Claims, 10 Drawing Sheets

(56) References Cited

U.S. PATENT DOCUMENTS

| | | |
|---|---|---|
| 7,385,172 B2 | 6/2008 | Inoue et al. ............ 250/214 R |
| 7,408,210 B2 | 8/2008 | Ogura et al. ................. 257/233 |
| 7,460,162 B2 | 12/2008 | Koizumi et al. ............. 348/294 |
| 7,462,810 B2 | 12/2008 | Kobayashi et al. ....... 250/208.1 |
| 7,550,793 B2 | 6/2009 | Itano et al. .................. 257/239 |
| 7,592,579 B2 | 9/2009 | Tamura et al. ............ 250/208.1 |
| 7,709,780 B2 | 5/2010 | Inoue et al. ............... 250/214.1 |
| 7,719,587 B2 | 5/2010 | Ogura et al. ................. 348/302 |
| 7,741,593 B2 | 6/2010 | Iwata et al. ............... 250/214 R |
| 7,825,974 B2 | 11/2010 | Itano et al. ................... 348/308 |
| 7,920,192 B2 | 4/2011 | Watanabe et al. ........... 348/308 |
| 7,978,241 B2 | 7/2011 | Koizumi et al. ............. 348/294 |
| 7,982,789 B2 | 7/2011 | Watanabe et al. ........... 348/308 |
| 8,023,025 B2 | 9/2011 | Itano et al. ................... 348/308 |
| 8,063,351 B2 | 11/2011 | Kobayashi et al. ........ 250/208.1 |
| 8,063,958 B2 | 11/2011 | Okita et al. .................. 348/241 |
| 8,063,967 B2 | 11/2011 | Itano et al. ................... 348/308 |
| 8,081,245 B2 | 12/2011 | Itano et al. ................... 348/301 |
| 8,085,319 B2 | 12/2011 | Ono et al. .................... 348/241 |
| 8,159,577 B2 | 4/2012 | Iwata et al. ................... 348/296 |
| 8,289,431 B2 | 10/2012 | Itano ............................ 348/308 |
| 8,355,066 B2 | 1/2013 | Iwata et al. ................... 348/294 |
| 8,363,137 B2 | 1/2013 | Sonoda et al. ............... 348/302 |
| 8,368,790 B2 | 2/2013 | Itano et al. ................... 348/301 |
| 8,390,708 B2 | 3/2013 | Koizumi et al. ............. 348/294 |
| 8,400,546 B2 | 3/2013 | Itano et al. ................... 348/308 |
| 8,411,187 B2 | 4/2013 | Watanabe et al. ........... 348/308 |
| 8,441,558 B2 | 5/2013 | Okita et al. .................. 348/241 |
| 8,507,870 B2 | 8/2013 | Arishima et al. ........ 250/370.08 |
| 8,530,989 B2 | 9/2013 | Kikuchi et al. ............... 257/429 |
| 8,582,009 B2 | 11/2013 | Kono et al. .................. 348/302 |
| 8,598,901 B2 | 12/2013 | Hiyama et al. ............ 324/750.3 |
| 8,659,692 B2 | 2/2014 | Matsuda et al. ............. 348/302 |
| 8,670,049 B2 | 3/2014 | Ono et al. .................... 348/241 |
| 8,670,056 B2 | 3/2014 | Kono et al. .................. 348/294 |
| 8,687,246 B2 | 4/2014 | Fujimura et al. ............. 358/482 |
| 8,698,935 B2 | 4/2014 | Okita et al. .................. 348/314 |
| 8,710,610 B2 | 4/2014 | Kono et al. .................. 257/435 |
| 8,711,259 B2 | 4/2014 | Maehashi et al. ............ 348/294 |
| 8,742,359 B2 | 6/2014 | Arishima et al. ........ 250/370.08 |
| 8,749,675 B2 | 6/2014 | Koizumi et al. ............. 348/302 |
| 8,836,833 B2 | 9/2014 | Yamashita et al. ........... 348/301 |
| 8,836,838 B2 | 9/2014 | Nakamura et al. ........... 348/308 |
| 8,896,029 B2 | 11/2014 | Koizumi et al. ............. 257/202 |
| 8,913,168 B2 | 12/2014 | Matsuda et al. ............. 348/302 |
| 8,928,786 B2 | 1/2015 | Iwata et al. ................... 348/294 |
| 9,029,752 B2 | 5/2015 | Saito et al. ................ 250/208.1 |
| 9,083,906 B2 | 7/2015 | Nakamura et al. ........................ H04N 5/37455 |
| 9,154,718 B2 | 10/2015 | Sato et al. |
| 9,232,165 B2 | 1/2016 | Saito et al. .......... H04N 5/3575 |
| 9,288,415 B2 | 3/2016 | Yamazaki et al. ........................ H04N 5/37455 |
| 9,432,607 B2 | 8/2016 | Morita et al. .......... H04N 5/378 |
| 9,438,828 B2 | 9/2016 | Itano et al. .......... H04N 5/3458 |
| 9,438,841 B2 | 9/2016 | Yamazaki et al. ........................ H04N 5/37455 |
| 9,602,752 B2 | 3/2017 | Kobayashi et al. ... H04N 5/378 |
| 9,716,823 B2 | 7/2017 | Iwata et al. ........ H04N 5/23212 |
| 9,825,077 B2 | 11/2017 | Watanabe et al. ........................ H01L 27/14616 |
| 2007/0262972 A1* | 11/2007 | Nakata ................. G09G 3/3696 345/204 |
| 2011/0003426 A1 | 1/2011 | Watanabe et al. .............. 438/73 |
| 2012/0008030 A1 | 1/2012 | Kono et al. ................... 348/301 |
| 2012/0182450 A1* | 7/2012 | Sato ..................... H04N 5/3575 348/241 |
| 2012/0262613 A1 | 10/2012 | Kono et al. ................... 348/300 |
| 2013/0002916 A1 | 1/2013 | Itano ............................ 348/302 |
| 2015/0049227 A1* | 2/2015 | Sato ..................... H04N 5/3575 348/300 |
| 2015/0070488 A1* | 3/2015 | Wang ..................... G01K 13/00 348/135 |
| 2015/0122975 A1 | 5/2015 | Saito et al. ................ 250/208.1 |
| 2016/0227141 A1 | 8/2016 | Kobayashi et al. . H04N 5/3698 |
| 2016/0373626 A1* | 12/2016 | Stetson ................ H04N 5/2258 |
| 2017/0155862 A1 | 6/2017 | Kobayashi et al. ........................ H01L 27/14609 |
| 2017/0257605 A1 | 9/2017 | Iwakura et al. .. H01L 27/14607 |
| 2017/0310913 A1 | 10/2017 | Takada et al. ....... H04N 5/3696 |

OTHER PUBLICATIONS

U.S. Appl. No. 15/799,251, filed Oct. 31, 2017.
U.S. Appl. No. 15/704,979, filed Sep. 14, 2017.
U.S. Appl. No. 15/854,304, filed Dec. 26, 2017.
U.S. Appl. No. 15/839,518, filed Dec. 12, 2017.
Japanese Office Action dated Feb. 21, 2019 during prosecution of related Japanese application No. 2016-255024. (English-language machine translation included.).

* cited by examiner

SOLID STATE IMAGING DEVICE

BACKGROUND OF THE INVENTION

Field of the Invention

The present invention relates to a solid state imaging device.

Description of the Related Art

When a solid state imaging device is operated, a noise occurring in an image may vary depending on the temperature of the solid state imaging device. Thus, in order to correct an image signal based on the temperature of the solid state imaging device, a temperature sensor may be provided in the solid state imaging device. Japanese Patent Application Laid-Open No. 2012-151664 discloses a solid state imaging device having a temperature sensor.

In Japanese Patent Application Laid-Open No. 2012-151664, there is no disclosure regarding a noise due to the temperature sensor being provided in the solid state imaging device.

SUMMARY OF THE INVENTION

The present invention intends to provide a solid state imaging device with a reduced noise due to a temperature sensor.

According to one embodiment of the present invention, provided is a solid state imaging device including a pixel array including a plurality of pixels aligned so as to form a plurality of rows and a plurality of columns, each of the pixels having a photoelectric conversion element; a first readout circuit configured to read out signals from the plurality of pixels on a column basis; a temperature sensor configured to output a signal in accordance with a temperature; and a current control circuit configured to control a current supplied to the temperature sensor. The current control circuit performs control in a first period such that a predetermined current is supplied to the temperature sensor, and performs control in a second period such that a current supplied to the temperature sensor becomes smaller than the predetermined current or stops. The first period is set in a first blanking period between a process in which the first readout circuit reads out one frame of signals output from the plurality of pixels and a process in which the first readout circuit reads out next one frame of signals output from the plurality of pixels.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings. Throughout a plurality of drawings, elements having the same function are labeled with the same reference symbol, and the duplicated description may be omitted or simplified.

First Embodiment

Figure 1:
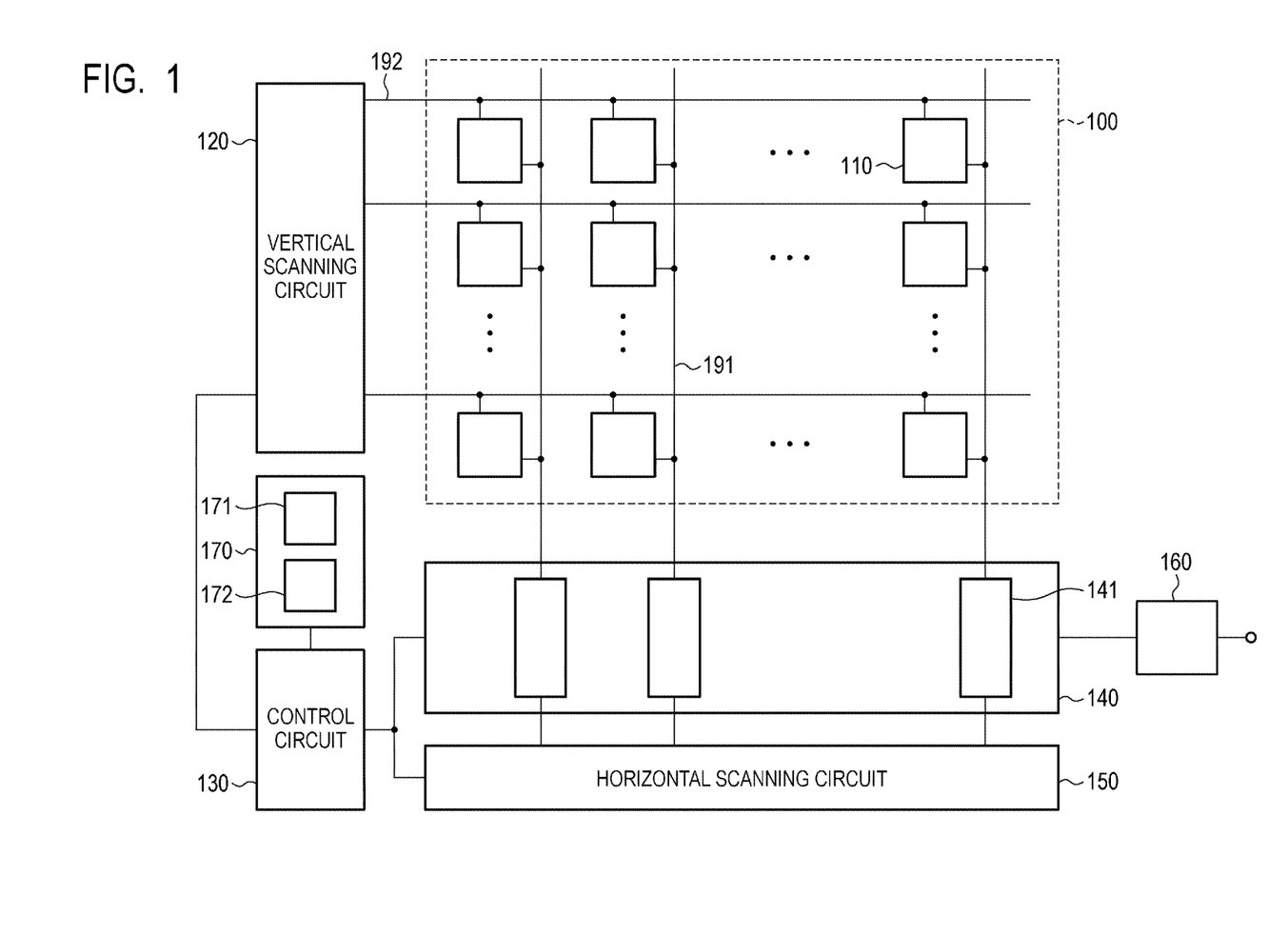
FIG. 1 is a block diagram of a solid state imaging device according to a first embodiment.

FIG. 1 is a block diagram illustrating an example configuration of a solid state imaging device according to a first embodiment. The solid state imaging device has a pixel array 100, a vertical scanning circuit 120, a control circuit 130, a readout unit 140, a horizontal scanning circuit 150, an output circuit 160, and a temperature sensor circuit 170. The solid state imaging device is a semiconductor device formed on a semiconductor substrate such as a silicon substrate, which is a CMOS image sensor in the present embodiment. The pixel array 100 includes a plurality of pixels 110 aligned in a two-dimensional manner so as to form a plurality of rows and a plurality of columns. The vertical scanning circuit 120 supplies a plurality of control signals for controlling a plurality of transistors included in the pixels 110 to be turned on (a conduction state) or turned off (a non-conduction state). The control signals are supplied to respective pixels 110 via row signal lines 192 arranged on a row basis of the pixel array 100.

Column signal lines 191 are provided in the pixel array 100 on a column basis, pixel signals from the pixels 110 are read out to the column signal lines 191 on a column basis. The readout unit 140 has column circuits 141 provided correspondingly to respective columns of the pixel array 100 and adapted to read out the signals from the pixels 110 on a column basis. Each of the column circuits 141 performs processes such as amplification of a pixel signal output to the column signal line 191, a correlated double sampling process based on a signal obtained at the time of reset and a signal obtained at the time of photoelectric conversion of the pixel 110, and the like. The horizontal scanning circuit 150 controls the switches connected to the amplifiers of the column circuits 141 to be turned on or off and thereby supplies control signals for performing horizontal scan.

The temperature sensor circuit 170 is a sensor circuit that outputs a signal to the outside of the solid state imaging device in accordance with the temperature of the solid state imaging device. The temperature sensor circuit 170 has a temperature sensor 171 in which the terminal voltage thereof changes in accordance with a temperature and thereby a signal is output in accordance with the temperature. The temperature sensor circuit 170 functions as a sensor that senses a temperature by outputting the terminal voltage of the temperature sensor 171 or a signal based thereon. The temperature sensor 171 may be formed of, for example, a diode, a bipolar transistor, or the like. For example, when a diode, a bipolar transistor, or the like is formed by using PN junction formed inside a semiconductor substrate such as a silicon, the diode or the bipolar transistor has temperature-dependent current-voltage characteristics and thus functions as the temperature sensor 171.

The temperature sensor circuit 170 further has a light reduction unit 172. The light reduction unit 172 is a unit adapted to reduce a light emitted from the temperature sensor 171 and then entering the pixel 110. The light reduction unit 172 may include a unit adapted to reduce the amount of a light emission at the temperature sensor or a unit adapted to reduce the amount of a light entering the pixel 110 from an emitted light. The specific example of the light reduction unit 172 and the advantage obtained by providing the light reduction unit 172 will be described later.

The control circuit 130 controls the vertical scanning circuit 120, the readout unit 140, the horizontal scanning circuit 150, and the temperature sensor circuit 170. The control circuit 130 may include a timing generator that supplies timing signals to respective circuits, for example. The output circuit 160 includes a buffer amplifier, a differential amplifier, or the like and outputs pixel signal from the column circuit 141 to a signal processing unit of an imaging system of some device outside the solid state imaging device, for example, a camera or the like. Further, the solid state imaging device may be configured to output a digital pixel signal by further providing an analog-to-digital (AD) conversion unit inside the solid state imaging device, for example, the column circuits 141.

Note that, while one temperature sensor circuit 170 only is depicted, a plurality of temperature sensor circuits may be provided within the solid state imaging device. Further, the output signal of the temperature sensor circuit 170 may be output outside the solid state imaging device after processed in a circuit within the solid state imaging device.

Figure 2:
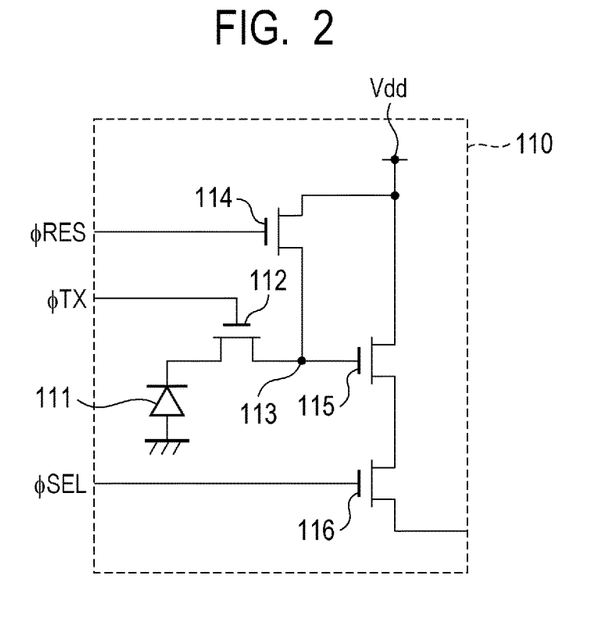
FIG. 2 is an equivalent circuit diagram of a pixel according to the first embodiment.

FIG. 2 is an equivalent circuit diagram illustrating an example configuration of the pixel 110 according to the first embodiment. The pixel 110 has a photodiode 111, a transfer transistor 112, a reset transistor 114, an amplification transistor 115, and a selection transistor 116.

The photodiode 111 is a photoelectric conversion element that generates and accumulates charges in accordance with an incident light by photoelectric conversion. The photodiode 111 may be formed by PN junction formed within a semiconductor substrate such as a silicon. The anode of the photodiode 111 is connected to the ground, and the cathode of the photodiode 111 is connected to the source of the transfer transistor 112. The drain of the transfer transistor 112 is connected to a floating diffusion 113 that is the gate node of the amplification transistor 115. The transfer transistor 112 is controlled by a control signal ϕTX supplied from the vertical scanning circuit 120 and, when turned on, functions as a transfer unit that transfers charges of the photodiode 111 to the floating diffusion 113.

The drain of the amplification transistor 115 is connected to a power source wiring having a power source voltage Vdd, and the source of the amplification transistor 115 is connected to the drain of the selection transistor 116. The source of the selection transistor 116 is connected to the column signal line 191. A constant current source (not illustrated) is connected to the column signal line 191. The selection transistor 116 is controlled by a control signal ϕSEL input to the gate and, when turned on, causes the source of the amplification transistor 115 and the column signal line 191 to be connected to each other to function as a source follower. At this time, an output signal based on a voltage of the floating diffusion 113 is output to the readout unit 140 via the column signal line 191 on each column. In such a way, the amplification transistor 115 functions as a signal output unit that outputs a signal in accordance with the transferred charges, and the floating diffusion 113 has a function of receiving the transferred charges as an input node of the signal output unit.

The drain of the reset transistor 114 is connected to the power source wiring having the power source voltage Vdd, and the source of the reset transistor 114 is connected to the floating diffusion 113. The reset transistor 114 is controlled by a control signal ϕRES input to the gate and, when turned on, resets the voltage of the floating diffusion 113.

Note that reference to a source and a drain of a transistor may be different in accordance with a conduction type, a focused function, or the like of the transistor, and reference may be made by names opposite to the source and the drain described above.

Note that, although the configuration in which the single photodiode 111 is provided in the pixel 110 is illustrated as an example in FIG. 2, the configuration is not limited thereto. For example, such a pixel configuration may be employed that a plurality of photodiodes and a plurality of transfer transistors are provided in one pixel and charges are transferred from the plurality of photodiodes to one floating diffusion.

As discussed above, in the present embodiment, the solid state imaging device has the temperature sensor circuit 170 having the temperature sensor 171 and the pixels 110 each having the photodiode 111 as a photoelectric conversion element. For such a configuration, the inventors of the present application have found that the temperature sensor 171 may emit a light in response to a current supplied to the temperature sensor 171 and a noise may occur in an output signal because the light is photoelectrically converted in the photoelectric conversion element. For example, when the temperature sensor 171 is a diode, a bipolar transistor, or the like, a large current flowing in PN junction or the like of the diode or the bipolar transistor may cause light emission thereof. In such a way, a noise may occur due to the temperature sensor 171 being provided within the solid state imaging device. Therefore, when the temperature sensor 171 is formed together with the photoelectric conversion element, reduction of such a noise may be an object.

To address this, in the present embodiment, the solid state imaging device includes the light reduction unit 172 adapted to reduce a light emitted from the temperature sensor 171 and then entering the pixel 110. For example, the light reduction unit 172 may reduce the light emission amount at the temperature sensor 171. Alternatively, the light reduction unit 172 may reduce the amount of a light entering the pixel 110 from the emitted light. In this way, the light reduction unit 172 allows for a reduction of a noise occurring due to photoelectric conversion of a light from the temperature sensor 171. Therefore, a solid state imaging device with a reduced noise due to the temperature sensor 171 can be provided.

Note that, although the light reduction unit 172 is depicted within the temperature sensor circuit 170 in FIG. 1, the function of the light reduction unit 172 may be outside the temperature sensor circuit 170 or may be included in another block. For example, the light reduction unit 172 may be provided separately from the block depicted in FIG. 1 or may be embedded within the pixel array 100.

Second Embodiment

Figure 3:
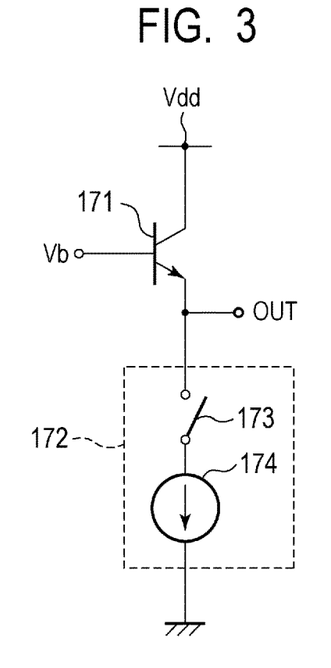
FIG. 3 is an equivalent circuit diagram of a temperature sensor circuit according to a second embodiment.

In the following embodiment, the specific example of the configuration of the light reduction unit 172 described in the first embodiment will be described in more detail. FIG. 3 is an equivalent circuit diagram illustrating an example configuration of the temperature sensor circuit 170 according to a second embodiment. Note that, since the features other than the temperature sensor circuit 170 are the same as that of the first embodiment, the description thereof will be omitted. The temperature sensor circuit 170 has a temperature sensor 171, a switch 173, and a constant current source 174. In the present embodiment, the temperature sensor 171 is an NPN-type bipolar transistor. Further, at least one of the switch 173 and the constant current source 174 corresponds to the light reduction unit 172 described in the first embodiment.

In the temperature sensor 171, the power source voltage Vdd is applied to the collector of the temperature sensor 171, and a bias voltage Vb is applied to the base. The emitter of the temperature sensor 171 is connected to one end of the switch 173, and the other end of the switch 173 is connected to the constant current source 174. The emitter of the temperature sensor 171 forms an output terminal OUT of the temperature sensor circuit 170. The constant current source 174 supplies a current flowing in the collector-to-emitter of the temperature sensor 171. The constant current source 174 may have a function of changing a supplying current. The switch 173 is controlled to be turned on or off by a control signal from the control circuit 130, for example. By turning off the switch 173, it is possible to stop the current flowing in the collector-to-emitter of the temperature sensor 171.

The emitter voltage of the temperature sensor 171, that is, the voltage of the output terminal OUT depends on a temperature. Thus, by causing the constant current source 174 to flow a constant current in the temperature sensor 171, a signal in accordance with the temperature can be acquired from the output terminal OUT. Further, when the current supplied by the constant current source 174 is changed, a difference between the emitter voltages before the change and after the change also depends on a temperature. Thus, the constant current source 174 may be configured to be able to supply two or more types of currents, and a signal in accordance with the temperature may be output by acquiring a difference of two or more emitter voltages corresponding to respective currents.

In the present embodiment, the switch 173 may function as the light reduction unit 172, for example. In a period for measuring the temperature (first period), by controlling the switch 173 to an on state, it is possible to control a predetermined current to be supplied to the temperature sensor 171. On the other hand, in a period for not measuring the temperature (second period), by controlling the switch 173 to an off state, it is possible to control current supply to the temperature sensor 171 to stop. Thereby, since light emission from the temperature sensor 171 is suppressed during the second period, a noise due to the temperature sensor can be reduced.

Note that, although the temperature sensor 171 is depicted as an NPN-type bipolar transistor in FIG. 3, the temperature sensor 171 is not limited thereto. For example, by changing the circuit configuration as appropriate, a PNP-type bipolar transistor, a diode using PN junction, or the like may be used.

Figure 4:
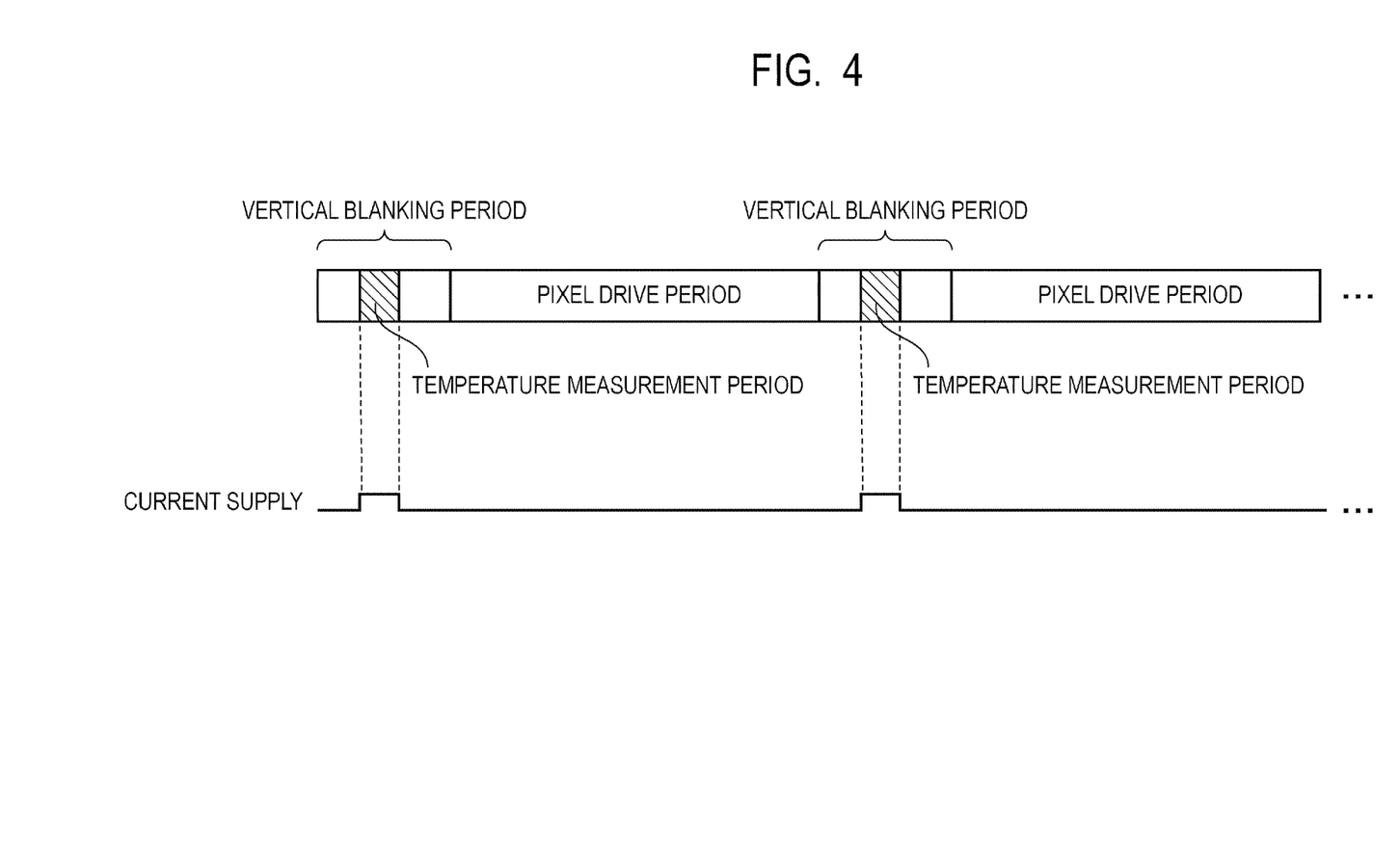
FIG. 4 is a timing chart illustrating the drive timing of a solid state imaging device according to the second embodiment.

FIG. 4 is a timing chart illustrating an example of two frames of the readout drive timing of the solid state imaging device according to the second embodiment. FIG. 4 illustrates a drive method in which a pixel drive period for acquiring a signal forming one frame of images and a vertical blanking period (first blanking period) in which no output of a signal forming an image is performed are repeated when the solid state imaging device captures a motion image. In other words, the vertical blanking period is a period between a process in which the column circuit 141 reads out one frame of signals output from the pixel 110 and a process in which the column circuit 141 reads out the next one frame of signals.

The driving of the temperature sensor circuit 170 for measuring the temperature is performed within a vertical blanking period. This period corresponds to the first period. In this first period, for example, a current is supplied to the temperature sensor 171 by controlling the switch 173 to an on-state. In the timing chart of "current supply" of FIG. 4, a high level indicates that the switch 173 is in an on-state, and a low level indicates that the switch 173 is in an off-state. In the second period, that is, a period of not measuring the temperature, the switch 173 is controlled in an off-state, and no current is supplied to the temperature sensor 171. With a use of this drive method, driving for shortening a period in which a current is supplied to the temperature sensor 171 is realized, and a noise due to the temperature sensor 171 can be reduced.

Note that, although a drive method illustrated in FIG. 4 is an example of performing temperature measurement once per frame, the number of times is not limited thereto, and multiple times of temperature measurement per frame may be performed. In the drive method of performing multiple times of temperature measurement per frame, when sufficient time can be ensured for temperature measurement, the temperature measurement may be performed in a horizontal blanking period (second blanking period) within a pixel drive period. Here, the horizontal blanking period is a period, in readout of one frame of signals, between a process in which a signal output unit of a first row outputs a signal and a process in which a signal output unit of a second row different from the first row outputs a signal.

Note that, instead of stopping the current supplied to the temperature sensor 171 in the second period, the supplied current in the second period may be smaller than that in the first period. For example, when the constant current source 174 is able to change the supply current, a current supplied to the temperature sensor 171 by the constant current source 174 in the second period can be controlled to be smaller than the current supplied in the first period. In this configuration, the constant current source 174 may function as the light reduction unit 172. In this case, since light emission from the temperature sensor 171 can be smaller in the second period, a noise due to the temperature sensor 171 can be reduced. Furthermore, the response to a change in the current amount can be faster compared to the case where current supply is stopped in the period of not measuring the temperature. Note that, in this configuration, the switch 173 may be omitted.

In this way, in the present embodiment, both of the switch 173 and the constant current source 174 may function as a current control circuit that controls a current supplied to the temperature sensor 171. This current control circuit performs control such that a predetermined current is supplied to the temperature sensor 171 in the first period. Furthermore, the current control circuit controls the current supplied to the temperature sensor 171 in the second period to be smaller than that in the first period or stopped. Thereby, the current control circuit functions as the light reduction unit 172.

The current control circuit as the light reduction unit 172 may be other circuit configurations than the configuration illustrated in FIG. 4. For example, a supply current to the temperature sensor 171 may be configured to be variable by providing a plurality of constant current sources such that the number of constant current sources to be connected to the temperature sensor 171 is selectable by switches.

Third Embodiment

Figure 5:
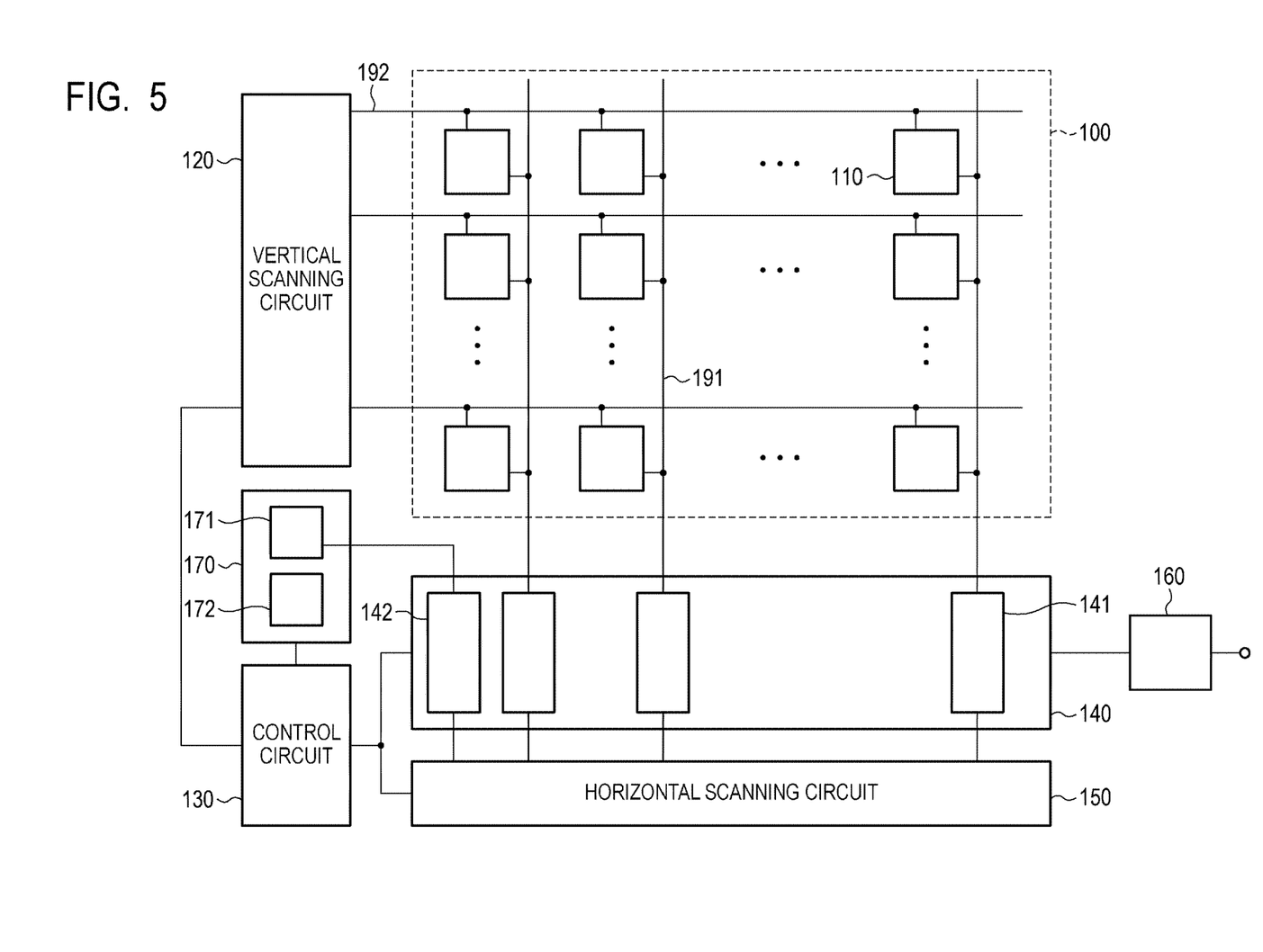
FIG. 5 is a block diagram of a solid state imaging device according to a third embodiment.

FIG. 5 is a block diagram illustrating an example configuration of a solid state imaging device according to a third embodiment. The solid state imaging device of the present embodiment has a column circuit 142 (second readout circuit) used for the temperature sensor circuit 170 in addition to the column circuits 141 (first readout circuit) used for the pixels 110 within the readout unit 140 as illustrated in FIG. 5. Since other features are the same as those of the first embodiment, the description thereof will be omitted. In response to control by the control circuit 130, the column circuit 142 performs readout for acquiring a signal in accordance with the temperature from the temperature sensor circuit 170. Note that, while the configuration of the temperature sensor circuit 170 can be selected as appropriate in the present embodiment, the description will be provided as the temperature sensor circuit 170 having the same configuration as illustrated in FIG. 3 as an example.

Figure 6A:
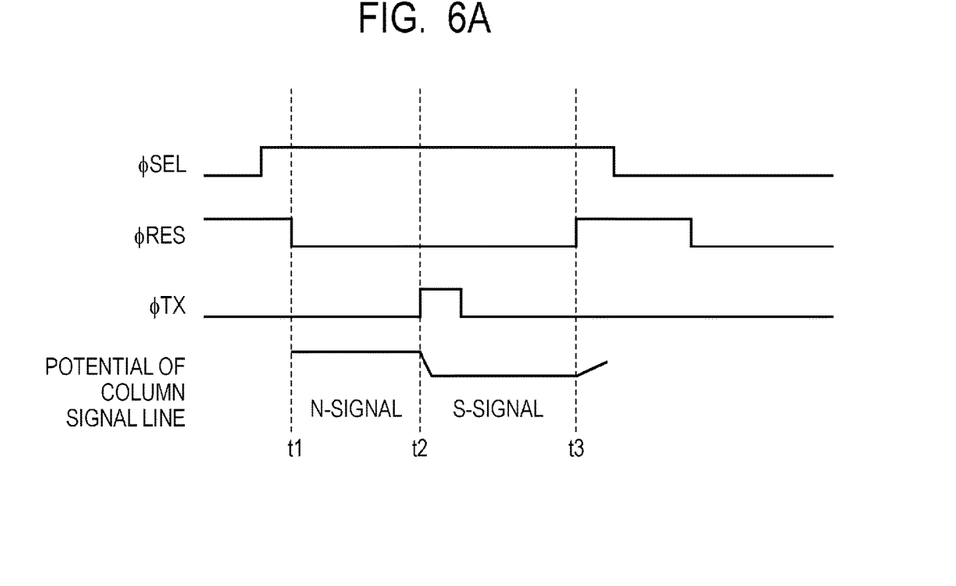
FIG. 6A and FIG. 6B are timing charts illustrating the drive timing of the solid state imaging device according to the third embodiment.
Figure 6B:
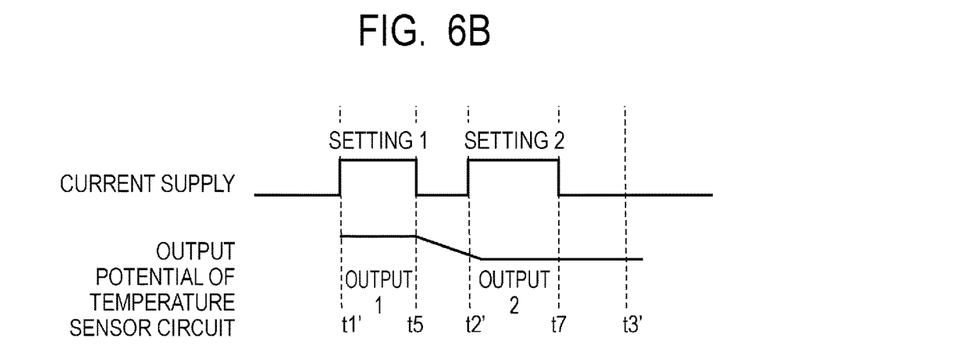

FIG. 6A and FIG. 6B are timing charts illustrating an example of a drive timing of the solid state imaging device according to the third embodiment. FIG. 6A is a timing chart illustrating a readout method of a signal of one row from the pixel 110. At the time before the time t1, the control signal φSEL becomes a high level and the selection transistor 116 is turned on, the pixel 110 on the subject row is selected. At this time, the control signal φRES is a high level and the reset transistor 114 is in an on-state, and thus the potential of the floating diffusion 113 is reset. At the time t1, the control signal φRES becomes a low level, and the reset transistor 114 is turned off. Thereby, a reset potential is held in the floating diffusion 113. At this time, a potential based on the reset potential of the floating diffusion 113 appears on the column signal line 191, and readout of the potential is performed by the column circuit 141. The signal read out at this time is called an N-signal.

At the time t2, the control signal φTX temporarily becomes a high level, and the transfer transistor 112 is turned on. Thereby, charges accumulated in the photodiode 111 by photoelectric conversion are transferred to the floating diffusion 113, and the potential of the floating diffusion 113 changes in accordance with the amount of the transferred charges. At this time, a potential based on the potential of the floating diffusion 113 appears on the column signal line 191, and readout of the potential is performed by the column circuit 141. The signal read out at this time is called an S-signal. At the time t3, the control signal φRES again becomes a high level, the subject pixel 110 returns to a reset state. Then, the control signal φSEL again becomes a low level and the selection transistor 116 is turned off, and thereby the selection of the pixel 110 on the subject row is released and the readout is completed.

As described above, the period from the time t1 to the time t2 is a readout period of the N-signal, and the period from the time t2 to the time t3 is a readout period of the S-signal. After the readout of the N-signal and the S-signal, the column circuit 141 generates a pixel signal corresponding to an incident light by performing correlated double sampling for acquiring a difference between the S-signal and the N-signal.

FIG. 6B is a timing chart illustrating a readout method of a signal from the temperature sensor circuit 170. In the present drive method, a drive method of sequentially reading out two signals by the constant current source 174 supplying two types of current values to the temperature sensor 171 is illustrated as an example. In this case, a difference of the two output signals is a signal corresponding to the temperature. At the time t1', the constant current source 174 starts supplying a current at a first setting value to the temperature sensor 171 (setting 1). Thereby, the output potential of the temperature sensor circuit 170 becomes a first value (output 1). Then, at the time t5 before the time t2', the constant current source 174 stops supplying the current of the setting 1.

At the time t2', the constant current source 174 starts supplying a current at a second setting value to the temperature sensor 171 (setting 2). Thereby, the output potential of the temperature sensor circuit 170 becomes a second value (output 2). Then, at the time t7 before the time t3', the constant current source 174 stops supplying the current of the setting 2.

The column circuit 142 reads out the output potentials of the output 1 and the output 2 described above to acquire two signals. When it is possible to handle these signals in the same manner as the above-described N-signal and S-signal, the column circuit 142 may be formed of the same circuit as the column circuit 141. In the present embodiment, however, the time during which a current is supplied to the temperature sensor (t5−t1', t7−t2') is shorter than the readout time of the N-signal or the S-signal (t2−t1, t3−t2), as illustrated in FIG. 6A and FIG. 6B. In other words, the length of a period during which the column circuit 142 reads out one signal is shorter than the length of a period during which the column circuit 141 reads out one signal. Thereby, the emission amount of a light by the temperature sensor 171 is reduced, and a noise due to the temperature sensor 171 can be reduced.

Figure 7:
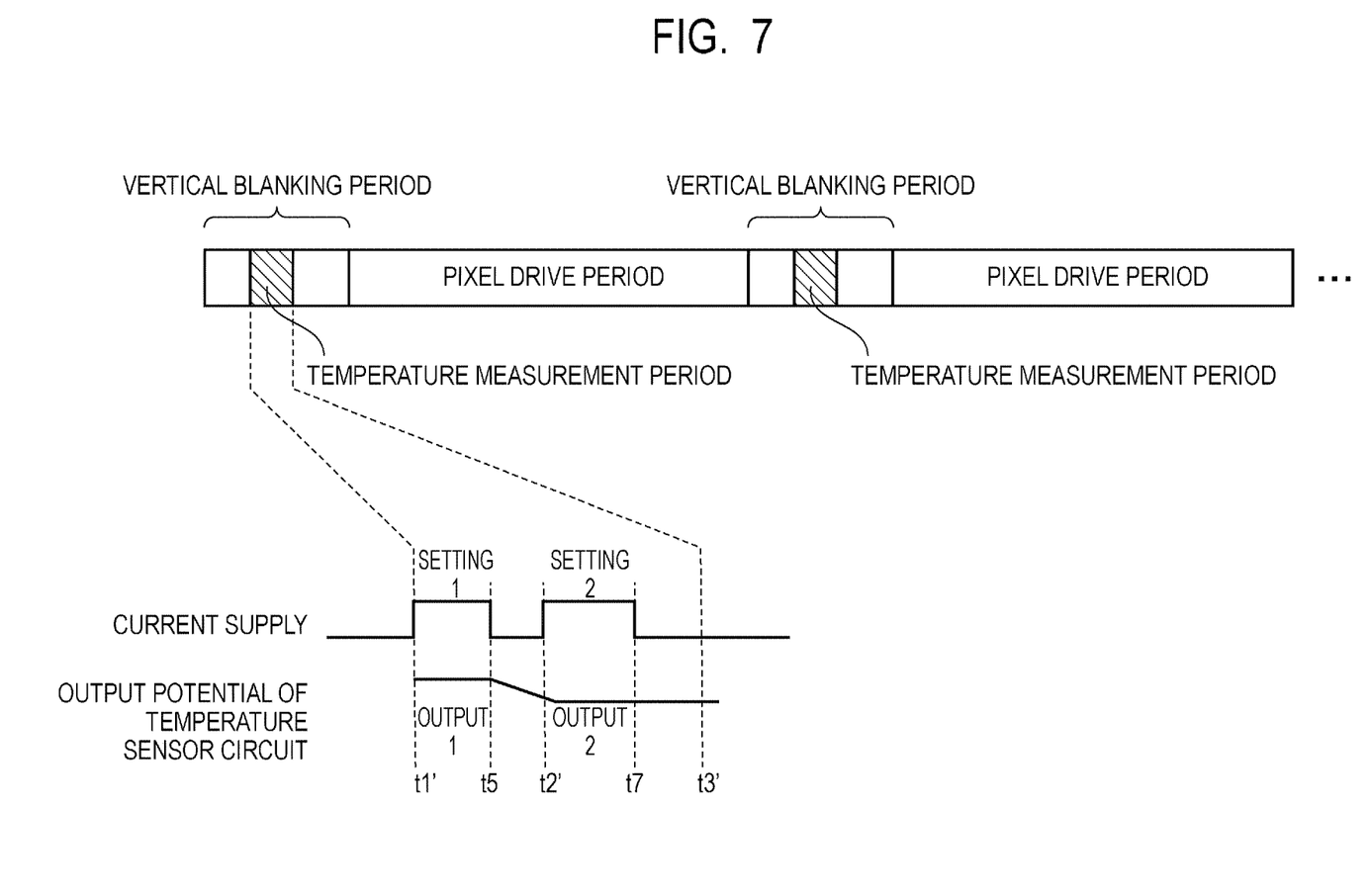
FIG. 7 is a timing chart illustrating the drive timing of the solid state imaging device according to the third embodiment.

FIG. 7 is a timing chart illustrating an example of two frames of readout drive timing of the solid state imaging device according to the third embodiment. As depicted, current supply to the temperature sensor 171 and readout from the temperature sensor 171 are performed within the vertical blanking period. No readout drive of the pixel 110 is performed in the vertical blanking period. Thus, even when the column circuits 141 and the column circuit 142 are provided in the readout unit 140 in an integral manner as illustrated in FIG. 5, the driving of the pixels 110 and the driving of the temperature sensor circuit 170 are not required to correspond to each other. This allows for differing the readout time between the pixels 110 and the temperature sensor circuit 170.

Note that the column circuits 141 and the column circuit 142 may be formed as separate circuits and thereby driving so as to differ the readout time between the pixels 110 and the temperature sensor circuit 170 may be implemented. In this case, current supply to the temperature sensor 171 and readout of the temperature sensor 171 may not be within the vertical blanking period.

Further, when sufficient time can be ensured for temperature measurement, the temperature measurement may be performed in a horizontal blanking period within the pixel drive period.

Fourth Embodiment

Figure 8:
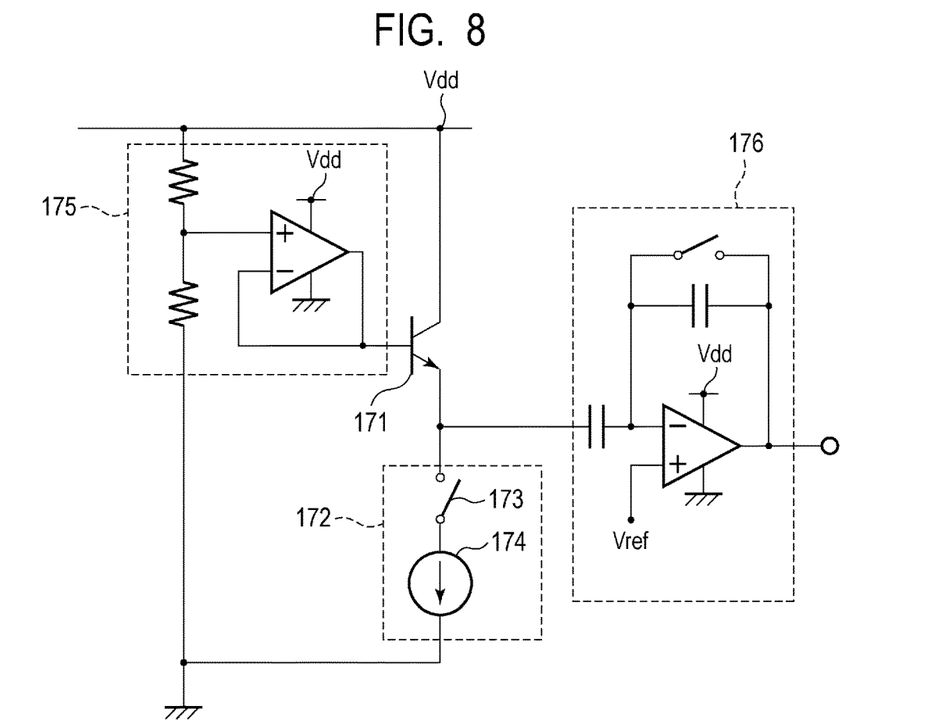
FIG. 8 is an equivalent circuit diagram of a temperature sensor circuit according to a fourth embodiment.

FIG. 8 is an equivalent circuit diagram of the temperature sensor circuit 170 according to the fourth embodiment. In the present embodiment, a more specific example of the configuration of the temperature sensor circuit 170 described in the second embodiment will be described. The temperature sensor circuit 170 of the present embodiment further has a bias voltage supply circuit 175 and an output amplification circuit 176 in addition to the temperature sensor 171, the switch 173, and the constant current source 174. The bias voltage supply circuit 175 is a circuit that supplies the bias voltage Vb supplied to the base of the temperature sensor 171. The output amplification circuit 176 is a circuit that amplifies the emitter voltage of the temperature sensor 171 and outputs the amplified voltage. Each of the bias voltage supply circuit 175 and the output amplification circuit 176 includes at least an amplifier such as a differential amplifier.

The bias voltage supply circuit 175 includes a differential amplifier that functions as a voltage follower and a voltage divider circuit formed of resistor elements for supplying a predetermined voltage to the non-inverting input terminal of the differential amplifier. This causes a predetermined bias voltage defined by a resistance ratio of the resistor elements to be supplied to the base of the temperature sensor 171.

The output amplification circuit 176 includes a differential amplifier, which functions as a voltage amplification circuit, and capacitor elements and a switch used for setting an amplification factor, holding a voltage, or the like. Thereby, the emitter voltage is amplified at a predetermined amplification factor defined by a capacitance ratio of the capacitor elements.

For the temperature sensor 171, control of stopping current supply or reducing the amount of current supply is performed in some period as described in the second embodiment. In contrast, the differential amplifiers included in the bias voltage supply circuit 175 and the output amplification circuit 176 are always conducted by the power source line as illustrated in FIG. 8. In other words, the differential amplifiers are supplied with currents in both of the first period and the second period. The reason why such a configuration is employed is that, while the effect of light emission is greater because of a larger current flowing in the temperature sensor 171, the effect is less because of relatively smaller currents flowing in the differential amplifiers even when the differential amplifiers are always conducted. Rather, since the response speed is important for the differential amplifiers included in the bias voltage supply circuit 175 and the output amplification circuit 176, it is preferable for the differential amplifiers to be always conducted for a faster response speed.

Note that the circuit configuration of the bias voltage supply circuit 175 and the output amplification circuit 176 may be different from that in FIG. 8 as long as the same function can be achieved.

Fifth Embodiment

Figure 9:
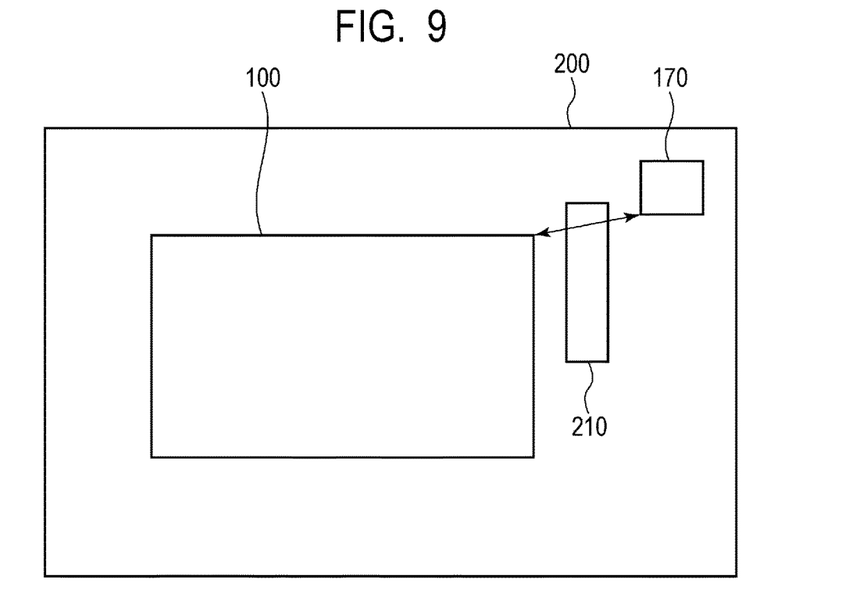
FIG. 9 is a schematic plan view of a solid state imaging device according to a fifth embodiment.

FIG. 9 illustrates a schematic plan view of a solid state imaging device according to a fifth embodiment. FIG. 9 illustrates an arrangement of some of the elements formed on the semiconductor substrate 200 such as a silicon on which the solid state imaging device is formed. That is, FIG. 9 illustrates the pixel array 100 including pixels 110, the temperature sensor circuit 170 including the temperature sensor 171, and a circuit element 210 arranged between the pixel array 100 and the temperature sensor circuit 170. This circuit element 210 may be any element not including the pixel 110. For example, the circuit element 210 may be the vertical scanning circuit 120, the control circuit 130, or the like.

With the circuit element 210 other than the pixel 110 being arranged between the pixels 110 and the temperature sensor 171, the distance between the pixels 110 and the temperature sensor 171 can be increased. This can reduce the amount of a light that occurs at the temperature sensor 171 and then enters the pixels 110, which decreases a noise occurring by photoelectric conversion of the light. Therefore, a solid state imaging device with a reduced noise due to the temperature sensor 171 can be provided. In other words, the circuit element 210 in the present embodiment may function as the light reduction unit 172 that reduces a light entering the pixels 110.

Sixth Embodiment

Figure 10:
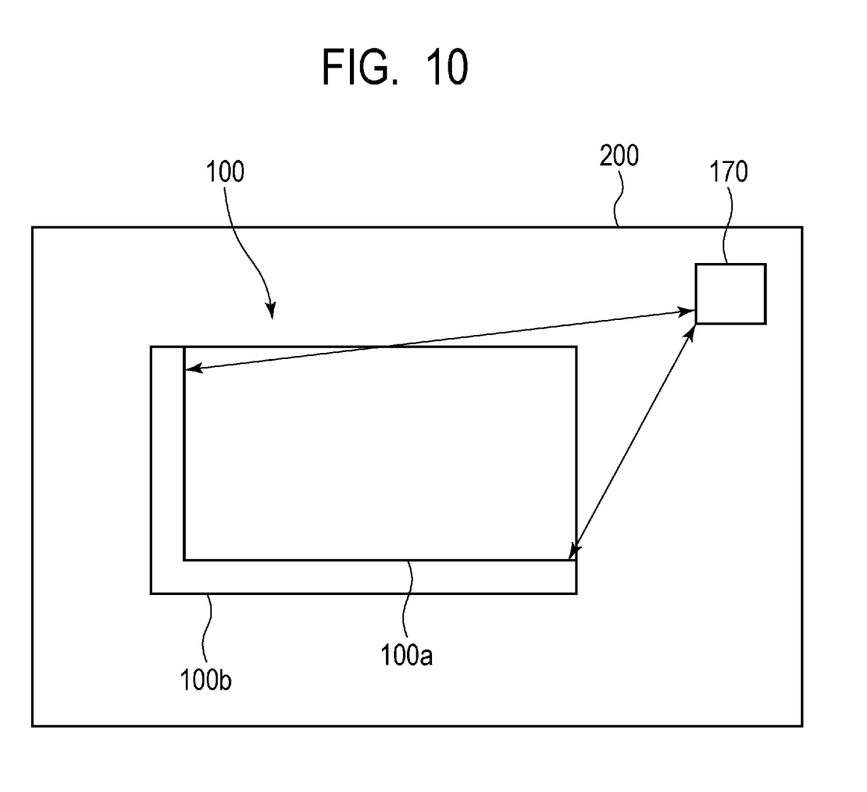
FIG. 10 is a schematic plan view of a solid state imaging device according to a sixth embodiment.

FIG. 10 illustrates a schematic plan view of a solid state imaging device according to a sixth embodiment. FIG. 10 illustrates an arrangement of some of the elements formed on the semiconductor substrate 200 such as a silicon on which the solid state imaging device is formed. That is, FIG. 10 illustrates the pixel array 100 including an imaging pixel region 100a and a light-shielding pixel region 100b and the temperature sensor circuit 170 including the temperature sensor 171.

The imaging pixel region 100a is a region in which imaging pixels configured such that a light may enter the photodiodes 111 are arranged. The light-shielding region 100b is a region in which light-shielding pixels with the photodiodes 111 shielded from a light are arranged. The light-shielding pixel is a pixel that outputs a reference signal used as a reference value for correction of a dark level of a pixel signal. If a light emitted from the temperature sensor 171 enters the light-shielding pixel, the reference value of correction of a dark level will vary, which may much affect the image quality.

As illustrated in FIG. 10, the light-shielding pixel region 100b is arranged along the left edge and the lower edge of the pixel array 100, the imaging pixel region 100a is arranged in the remaining region of the pixel array 100, and the temperature sensor circuit 170 is arranged in the right upper part outside the pixel array 100. That is, the imaging pixel region 100a is arranged between the light-shielding pixel region 100b and the temperature sensor circuit 170, which allows for the arrangement with an increased distance between the light-shielding pixel of the imaging pixel region 100a and the temperature sensor 171. This can reduce the amount of a light that occurs at the temperature sensor 171 and then enters the light-shielding pixels, which reduces a noise to the reference value for correction of the dark level occurring due to photoelectric conversion of the light. Therefore, a solid state imaging device with a reduced noise due to the temperature sensor can be provided. In other words, the imaging pixel region 100a in the present embodiment may function as the light reduction unit 172 that reduces a light entering the light-shielding pixels of the light-shielding pixel region 100b.

Seventh Embodiment

Figure 11:
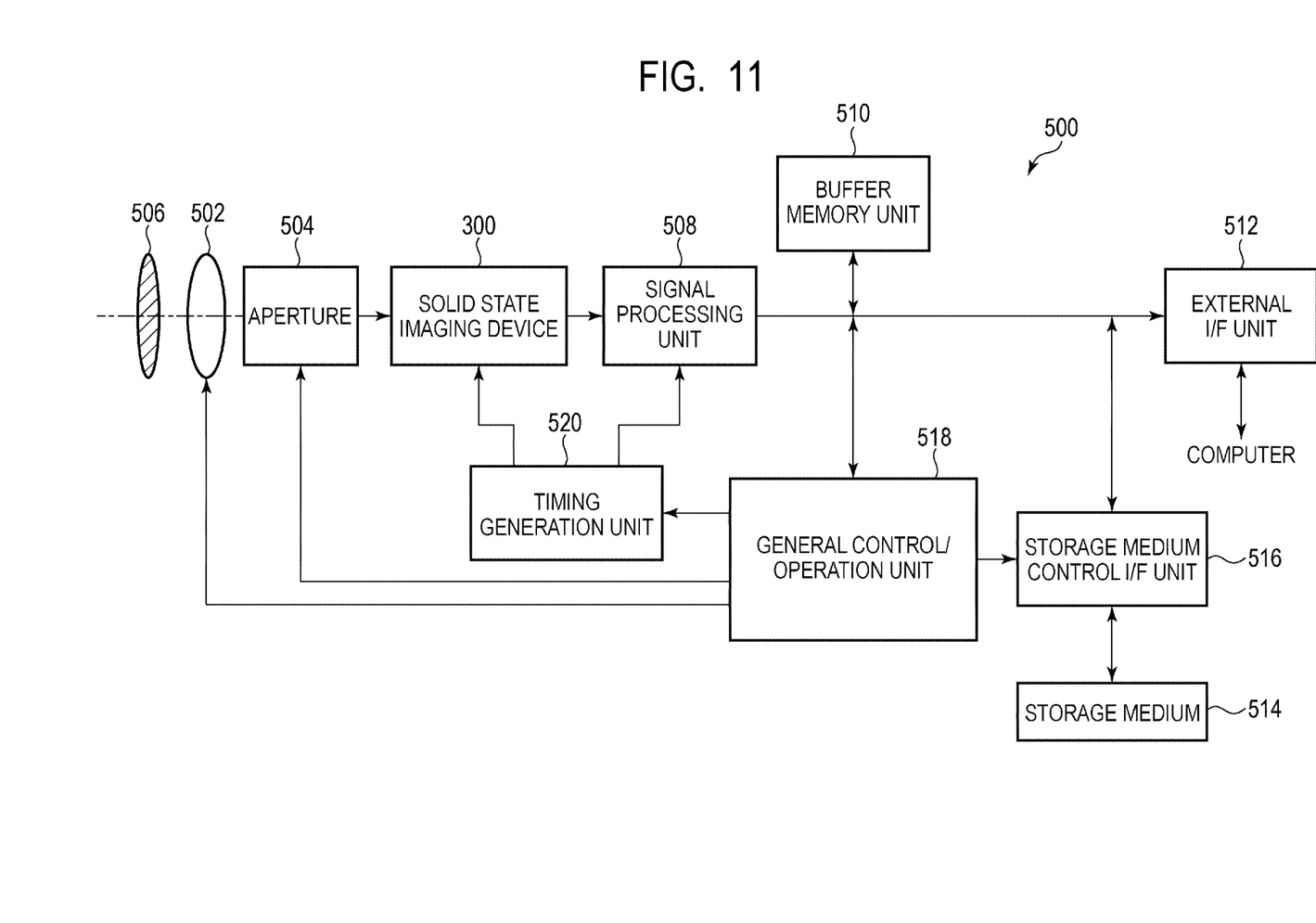
FIG. 11 is a block diagram of an imaging system according to a seventh embodiment.

Next, an example apparatus to which the solid state imaging device according to the above-described embodiments is applied will be described. FIG. 11 is a block diagram illustrating the configuration of the imaging system 500 according to the present embodiment. A solid state imaging device 300 illustrated in FIG. 11 is any of the solid state imaging devices described in the above first to sixth embodiments. The imaging system 500 to which the solid state imaging device 300 can be applied may be, for example, a digital still camera, a digital camcorder, a surveillance camera, or the like. FIG. 11 illustrates an example configuration of a digital still camera to which the solid state imaging device 300 described in any of the above-described embodiments is applied.

The imaging system 500 illustrated as an example in FIG. 11 has the solid state imaging device 300, a lens 502 that captures an optical image of a subject onto the solid state imaging device 300, an aperture 504 for changing a light amount passing through the lens 502, and a barrier 506 for protecting the lens 502. The lens 502 and the aperture 504 form an optical system that converges a light onto the solid state imaging device 300.

The imaging system 500 further has a signal processing unit 508 that processes an output signal output from the solid state imaging device 300. The signal processing unit 508 performs the operation of signal processing of performing various correction or compression on an input signal if necessary and outputting the signal. The signal processing unit 508 may have a function for performing an AD conversion process on an output signal output from the solid state imaging device 300. In this case, the solid state imaging device 300 is not necessarily required to have an AD conversion circuit therein.

The imaging system 500 further has a buffer memory unit 510 for temporarily storing image data therein and an external interface unit (external I/F unit) 512 for communicating with an external computer or the like. The imaging system 500 further has a storage medium 514 such as a semiconductor memory for performing storage or readout of image pickup data and a storage medium control interface unit (storage medium control I/F unit) 516 for performing storage or readout on the storage medium 514. Note that the storage medium 514 may be embedded in the imaging system 500 or may be removable.

The imaging system 500 further has a general control/operation unit 518 that performs various computation and controls the entire digital still camera and a timing generation unit 520 that outputs various timing signals to the solid state imaging device 300 and the signal processing unit 508. Here, the timing signal or the like may be input from the outside, and the imaging system 500 may have at least the solid state imaging device 300 and the signal processing unit 508 that processes an output signal output from the solid state imaging device 300. The general control/operation unit 518 and the timing generation unit 520 may be configured to implement a part of or all of the functions of the control circuit 130 or the like of the solid state imaging device 300.

The solid state imaging device 300 outputs an image forming signal to the signal processing unit 508. The signal processing unit 508 performs predetermined signal processing on an image forming signal output from the solid state imaging device 300 and outputs image data. Further, the signal processing unit 508 uses an image forming signal to generate an image.

A use of the solid state imaging device 300 of any of the first to sixth embodiments to form an imaging system can realize an imaging system that can acquire a higher quality image.

Eighth Embodiment

Figure 12A:
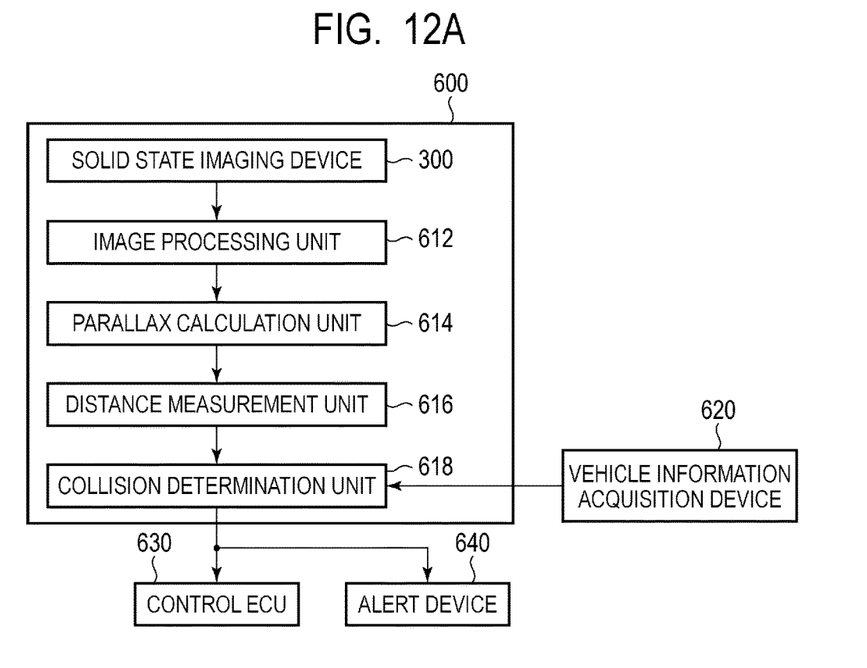
FIG. 12A and FIG. 12B are block diagrams of an imaging system and a mobile apparatus according to an eighth embodiment.
Figure 12B:
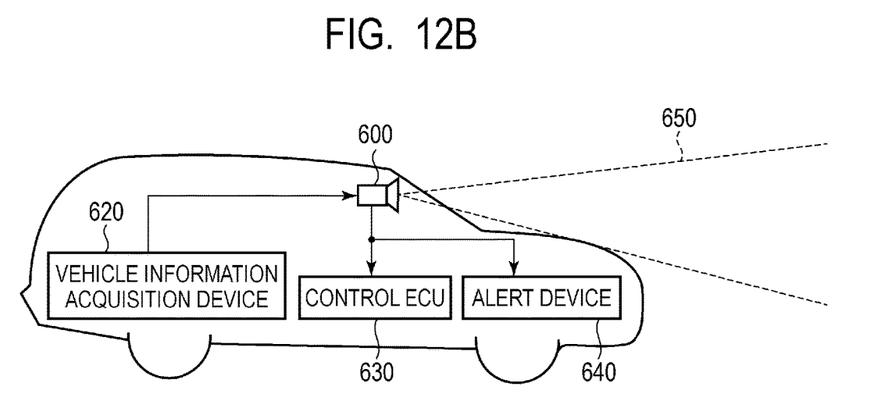

FIG. 12A and FIG. 12B are diagrams of the configuration of an imaging system 600 and a mobile apparatus according to the present embodiment. FIG. 12A illustrates an example of the imaging system 600 related to an on-vehicle camera. The imaging system 600 has the solid state imaging device 300. The solid state imaging device 300 is any of the solid state imaging devices 300 described in the above first to sixth embodiments. The imaging system 600 has an image processing unit 612 that performs image processing on a plurality of image data acquired by the solid state imaging device 300 and a parallax calculation unit 614 that calculates a parallax (a phase difference of parallax images) from the plurality of image data acquired by the imaging system 600. Further, the imaging system 600 has a distance measurement unit 616 that calculates a distance to the object based on the calculated parallax and a collision determination unit 618 that determines whether or not there is a collision possibility based on the calculated distance. Here, the parallax calculation unit 614 and the distance measurement unit 616 are an example of a distance information acquisition unit that acquires distance information on the distance to the object. That is, the distance information is information on a parallax, a defocus amount, a distance to an object, or the like. The collision determination unit 618 may use any of the distance information to determine the collision possibility. The distance information acquisition unit may be implemented by dedicatedly designed hardware or may be implemented by a software module. Further, the distance information acquisition unit may be implemented by a Field Programmable Gate Array (FPGA), an Application Specific Integrated Circuit (ASIC), or the like, or may be implemented by combination thereof.

The imaging system 600 is connected to the vehicle information acquisition device 620 and can acquire vehicle information such as a vehicle speed, a yaw rate, a steering angle, or the like. Further, the imaging system 600 is connected with a control ECU 630, which is a control device that outputs a control signal for causing a vehicle to generate braking force based on a determination result by the collision determination unit 618. That is, the control ECU 630 is an example of a mobile apparatus control unit that controls a mobile apparatus based on distance information. Further, the imaging system 600 is connected with an alert device 640 that issues an alert to the driver based on a determination result by the collision determination unit 618. For example, when the collision possibility is high as the determination result of the collision determination unit 618, the control ECU 630 performs vehicle control to avoid a collision or reduce damage by applying brake, pushing back an accelerator, suppressing engine power, or the like. The alert device 640 alerts a user by sounding an alert such as a sound, displaying alert information on a display of a car navigation system or the like, providing vibration to seat belt or a steering wheel, or the like.

In the present embodiment, an area around a vehicle, for example, a front area or a rear area is captured by using the imaging system 600. FIG. 12B illustrates the imaging system 600 in a case of capturing a front area of a vehicle (a capturing area 650). The vehicle information acquisition device 620 transmits instructions to operate the imaging system 600 and perform capturing. A use of the solid state imaging device 300 according to any of the first to sixth embodiments allows the imaging system 600 of the present embodiment to further improve the ranging accuracy.

Although the example of control for avoiding a collision to another vehicle has been illustrated in the above description, the embodiment is applicable to automatic driving control for following another vehicle, automatic driving control for not going out of a traffic lane, or the like. Furthermore, the imaging system is not limited to a vehicle such as the subject vehicle, and can be applied to a mobile apparatus (moving apparatus) such as a ship, an airplane, or an industrial robot, for example. In addition, the imaging system can be widely applied to a device which utilizes object recognition, such as an intelligent transportation system (ITS), without being limited to mobile apparatuses.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, it should be appreciated that an embodiment in which a part of the features of any of the embodiments is added to another embodiment or replaced with a part of the features of another embodiment is considered to be an embodiment to which the present invention may be applied.

This application claims the benefit of Japanese Patent Application No. 2016-255024, filed Dec. 28, 2016, which is hereby incorporated by reference herein in its entirety.

What is claimed is:

1. A solid state imaging device comprising:
   a pixel array including a plurality of pixels aligned so as to form a plurality of rows and a plurality of columns, each of the pixels having a photoelectric conversion element;
   a first readout circuit configured to read out signals from the plurality of pixels;
   a temperature sensor configured to output a signal in accordance with a temperature; and
   a current control circuit configured to control a current supplied to the temperature sensor,
   wherein the current control circuit performs control in a first period such that a predetermined current is supplied to the temperature sensor and the signal in accordance with the temperature is output from the temperature sensor, and performs control in a second period such that a current supplied to the temperature sensor becomes smaller than the predetermined current or stops, and
   wherein the first period is set in a period during which signals from the plurality of pixels are not read out by the first readout circuit.

2. The solid state imaging device according to claim 1, further comprising a second readout circuit configured to read out a signal from the temperature sensor,
   wherein the second readout circuit performs readout in the first period.

3. The solid state imaging device according to claim 1, further comprising a second readout circuit configured to read out a signal from the temperature sensor,
   wherein a length of a period in which the second readout circuit reads out one signal is shorter than a length of a period in which the first readout circuit reads out one signal.

4. The solid state imaging device according to claim 1, further comprising a voltage supply circuit configured to supply a bias voltage to the temperature sensor,
   wherein a current is supplied to an amplifier included in the voltage supply circuit during both of the first period and the second period.

5. The solid state imaging device according to claim 4, wherein the voltage supply circuit comprises a voltage divider circuit including a resistor element.

6. The solid state imaging device according to claim 1, further comprising an output amplification circuit configured to amplify a signal output from the temperature sensor,
   wherein a current is supplied to an amplifier included in the output amplification circuit during both of the first period and the second period.

7. The solid state imaging device according to claim 1, further comprising a circuit element arranged between the pixel array and the temperature sensor and not including the pixels.

8. The solid state imaging device according to claim 1, wherein the plurality of pixels includes an imaging pixel in which a light enters the photoelectric conversion element and a light-shielding pixel in which the photoelectric conversion element is shielded from a light, and
   wherein the imaging pixel is arranged between the light-shielding pixel and the temperature sensor.

9. The solid state imaging device according to claim 1, wherein the temperature sensor includes a diode.

10. The solid state imaging device according to claim 1, wherein the temperature sensor includes a bipolar transistor.

11. The solid state imaging device according to claim 1, wherein the first readout circuit reads out signals from the plurality of pixels in the second period.

12. The solid state imaging device according to claim 1, further comprising a current source configured to supply a current to the temperature sensor.

13. The solid state imaging device according to claim 12, further comprising a switch connected between the temperature sensor and the current source, wherein the current control circuit performs control to supply a current to the temperature sensor in the first period, and performs control to stop a current supply to the temperature sensor in the second period, by switching the switch.

14. The solid state imaging device according to claim 12, wherein the current supplied by the current source is variable.

15. The solid state imaging device according to claim 14, wherein the current control circuit performs control, by changing a current supplied by the current source, to supply a different current to the temperature sensor in the first period and in the second period.

16. The solid state imaging device according to claim 14, wherein, by changing a current supplied by the current source, the temperature sensor outputs a plurality of signals based on a plurality of current value.

17. The solid state imaging device according to claim 1, further comprising:
   a voltage supply circuit configured to supply a bias voltage to the temperature sensor; and
   an output amplification circuit configured to amplify a signal output from the temperature sensor,
   wherein a current is supplied to an amplifier included in the voltage supply circuit during both of the first period and the second period, and
   wherein a current is supplied to an amplifier included in the output amplification circuit during both of the first period and the second period.

18. The solid state imaging device according to claim 1, wherein the first period is set in a first blanking period between a process in which the first readout circuit reads out one frame of signals output from the plurality of pixels and a process in which the first readout circuit reads out a next one frame of signals output from the plurality of pixels.

19. The solid state imaging device according to claim 18, wherein each of the plurality of pixels further has a transfer unit configured to transfer charges generated at the photoelectric conversion element by photoelectric conversion and a signal output unit that has an input node to which charges are transferred and outputs a signal in accordance with a potential of the input node, and
   wherein the first period is set in a second blanking period between a process in which the signal output unit on a first row outputs a signal and a process in which the signal output unit on a second row outputs a signal, which is different from the first row, in readout of one frame of signals.

20. An imaging system comprising:
   the solid state imaging device according to claim 1; and
   a signal processing unit configured to process a signal output from the solid state imaging device.

21. A mobile apparatus comprising:
   the solid state imaging device according to claim 1;
   a distance information acquisition unit configured to acquire distance information of a distance to an object, from parallax images based on a signal from the solid state imaging device; and
   a mobile apparatus control unit adapted to control the mobile apparatus based on the distance information.

* * * * *